United States Patent [19]

Cook

[11] Patent Number: 5,271,096
[45] Date of Patent: Dec. 14, 1993

[54] METHOD AND STRUCTURE FOR CALIBRATING A COMPUTER GENERATED IMAGE

[75] Inventor: Robert L. Cook, San Francisco, Calif.

[73] Assignee: Light Source Computer Images, Inc., Larkspur, Calif.

[21] Appl. No.: 978,311

[22] Filed: Nov. 17, 1992

Related U.S. Application Data

[63] Continuation of Ser. No. 551,461, Jul. 12, 1990, abandoned.

[51] Int. Cl.$^5$ .............................................. G06F 15/20
[52] U.S. Cl. .................................... 395/131; 395/109
[58] Field of Search ............... 395/131, 121, 127, 126, 395/128, 129, 130, 133, 134, 138, 109; 358/405, 406; 382/54, 56, 48, 47

[56] References Cited

U.S. PATENT DOCUMENTS

| | | | |
|---|---|---|---|
| 4,500,919 | 2/1985 | Schreiber | 358/78 |
| 4,639,770 | 1/1987 | Jung et al. | 358/76 |
| 4,757,389 | 7/1988 | Clark et al. | 358/298 |
| 4,802,007 | 1/1989 | van der Brug | 358/139 |
| 5,018,008 | 5/1991 | Asada | 358/78 |

FOREIGN PATENT DOCUMENTS

0144188A2  11/1984  European Pat. Off. .

*Primary Examiner*—Heather R. Herndon
*Attorney, Agent, or Firm*—Townsend and Townsend Khourie and Crew

[57] ABSTRACT

A computer imaging system for calibration of scanners and printers. A calibration image is stored and manipulated as desired, and printed out as a resultant calibration picture. The resultant calibration picture is input to the system to create a resultant calibration image. A comparison is made between the original calibration image and the resultant calibration image, yielding calibration data indicating the distortion introduced by the hardware and software combination used in the calibration process. The calibration data is then used in a correction stage wherein a picture is input to the system, anti-distorted utilizing the calibration data, and an output picture provided with the anti-distorted data causing the output picture to appear substantially identical to the input picture. Alternatively, the calibration data is used together with a second set of calibration data generated by comparing an input calibration picture with known accurate data values corresponding to the calibration picture. The second set of calibration data is representative of the distortions caused by the input device only. The first and second sets of calibration data are combined, providing a third set of calibration data which represents distortions introduced by the output device only. The second and third sets of calibration data are used during normal operation of the system to provide computer images adjusted for the distortions which would otherwise be introduced by the input device, and which provide output pictures adjusted for the distortions which would otherwise be introduced by the output device.

18 Claims, 4 Drawing Sheets

METHOD AND STRUCTURE FOR CALIBRATING A COMPUTER GENERATED IMAGE

This is a continuation of application Ser. No. 07/551,461, filed Jul. 12, 1990, now abandoned.

BACKGROUND

This invention pertains to a system for automatically adjusting computer gray scale or color images in order to compensate for deviations resulting from the use of input devices such as scanners and/or output devices such as printers. In this manner, the print or video display of the image closely matches the original image, be it a computer rendered image or an image which was initially received via a scanner. The system accounts for the particular printing process used and for any programs that subsequently manipulate the image or prepare it for printing by doing color separation and half tone generation.

DESCRIPTION OF THE PRIOR ART

Computer imaging systems are faced with the problem that the printed image, for example that sent to a printer or a video screen, may not accurately represent the image as defined by the computer. This problem is exacerbated when the computer stored image is originated via a method which itself provides its own distortions, for example when an original image is provided to the computer via a scanner. Certain prior art systems have been developed which attempt to mitigate these problems.

A first such prior art image system is used by certain systems typically used in professional pre-print shops. With this method, the user specifies a small number of "aim points" (usually 3 or 4) on the image and controls the colors at those points. It has significant disadvantages:

1. Because it allows control over only a small number of aim points, other colors are often considerably skewed. This leaves the user with having to choose which parts of the image are the most important and taking what he gets with the rest. For example, in an advertisement, the user often has to choose between getting the color of the product right and having the flesh tones of the people be wrong, or getting the flesh tones right and having the product be the wrong color.

2. The process of specifying aim points is an esoteric art and requires a highly trained operator.

A second method is used by desk top computer scanning programs. With this method, the user has control over a few parameters, such as "brightness" and "contrast", that control a mapping of the colors seen by the scanner. Unfortunately, there are a number of problems with this method:

1. While these controls are somewhat easier to use than aim points, they are still intimidating to the average user, and it requires a significant amount of training to learn to use these controls effectively.

2. The only feedback to the user is what appears on the computer screen, which is usually very different from what is printed. The user can accurately determine the result of manipulations only by making a print. This makes the process very inaccurate and slow.

3. The entire process depends on the judgement of the user in determining which settings of the controls provide the best print.

4. As with the first prior art method, described above, no one setting of the controls will give an optimal result over the entire image.

A third prior art method, exemplified by U.S. Pat. No. 4,500,919, involves measuring the characteristics of the scanner and the printer in terms of device-independent CIE color coordinates. This approach is more accurate than the previous two methods. Its calibration technique involves printing a calibration sheet and then measuring color coordinates on that sheet with a device called a colorimeter; these measurements are tedious, time-consuming and require professional training. The need for these device-independent measurements is inherent in the method.

A fourth prior art method, described in U.S. Pat. No. 4,802,007, also involves printing a calibration sheet, but it does not require the measurements of that sheet to be device-independent. Instead of an expensive colorimeter, it uses a scanner to measure colors on the sheet. The resulting calibration is for the combination of scanner and printer, rather than for the printer separate from the scanner. This has the advantage that the calibration process can be made automatic because the color measurement information is directly available to the computer, but it imposes some significant limitations. Some of these limitations are a result of not having device-independent measurements and calibrating only for a scanner-printer combination; others arise because the method was designed to be part of a dedicated hardware system for a particular application and has characteristics that prevent it from being usable outside that system. These limitations are:

1. The calibration image data is fed directly to the printer, so that it cannot be processed by the computer. Therefore, this method will only work as part of a closed system in a way that fundamentally precludes its use with other software programs, for example page layout, desktop presentation, image editing and retouching programs, and the like.

2. The calibration data is tied to a particular printer and video system. Although not taught or suggested, if the system were to be expanded to calibrate a plurality of S scanners and a plurality of P printers, the calibration operation must be performed for each of the SxP combinations of scanners and printers, and calibration data related to each such calibration must be stored and readily available. Not only is this quite cumbersome, but in many situations certain of such combinations of input and output devices cannot be readily calibrated. For example, if the combination consists of an scanner being a slide reader and an printer being a flatbed printer, calibration cannot be performed because there is no direct way of having the slide reader input the flatbed print which has been output by the system.

3. The method does not provide that the data stored in the computer pertaining to particular areas within an image indicate intensities which are linearly proportional to the intensities contained in the original image which has been scanned, i.e., such that a first area in the original image which is twice as bright as a second area in the original image is stored as computer data having an intensity value which is twice the intensity value stored for the corresponding second region. The use of linearly proportional data is necessary to perform image editing operations without introducing distortions. A typical example of such distortions is the familiar jagged edges and "halo" effect of electronically "pasting" a foreground image over a background image, which may occur if the data associated with the foreground and background images are not both linearly proportional.

4. The method allows no way to accurately display or print computer rendered images, i.e., images that do not originate as scanned images but rather are originally generated by the computer.

SUMMARY OF THE INVENTION

The present invention has significant advantages over the prior art. In accordance with this invention, one is able to calibrate the printer and scanner in a device-independent manner, but without requiring device-independent color measurements of the printed calibration sheet.

In accordance with the teachings of this invention, a novel computer imaging system and method are taught which allow for calibration of scanners and printers. In one embodiment of this invention, the calibration is performed whereby a calibration image in the system is stored and manipulated as desired, and then printed out as a resultant calibration picture. The resultant calibration picture is then input to the system again to create a resultant calibration image. A comparison is made between the original calibration picture and the resultant calibration picture. This comparison yields calibration data indicating the distortion introduced by the particular hardware and software combination used in the calibration process. The calibration data is then used in a correction stage wherein a picture is input to the system, anti-distorted utilizing the calibration data, and an output picture is provided with the anti-distortion causing the output picture to appear substantially identical to the input picture.

In an alternative embodiment, the aforementioned calibration data is used together with a second set of calibration data which is generated by comparing scanned values of an input calibration picture with known accurate data values corresponding to said calibration picture. The second set of calibration data is representative of the distortions caused by the input device only. The first and second sets of calibration data are then combined to yield a third set of calibration data which represents distortions introduced by the output device only. The second and third sets of calibration data are then used during normal operation of the system in order to provide computer images which are adjusted for the distortions which would otherwise be introduced by the input device, and which provide output pictures which are adjusted for the distortions which would otherwise be introduced by the output device.

In accordance with this second embodiment of this invention, a plurality of said calibration data are stored, one for each input device, and one for each output device. Combinations of input and output devices are then selected as desired, and the entire system is calibrated using previously stored calibration images pertaining to the selected input and output devices. In this manner, it is not necessary to perform a calibration and store calibration data for every possible combination input device and output device.

BRIEF DESCRIPTION OF THE DRAWINGS

FIG. 2b depicts a second embodiment of a correction operation performed in accordance with the teachings of this invention which utilizes the calibration generated by the embodiment of FIG. 2a.

DETAILED DESCRIPTION

For the purposes of this specification, the following terms are used with the following definitions:

| | |
|---|---|
| Picture: | physical representation of a real-world scene, such as a print, slide, or a video signal. |
| Image: | pixel data stored in computer memory. |
| Scanner: | any image input device or process that converts a picture into an image, such as flat bed, drum, slide scanners, and video and still video cameras. |
| Printer: | any image output device or process that converts an image into a picture such as laserwriters, phototypesetters, offset printers, chromalins, video displays, lithography and the like. |
| Color: | color or grey scale. (of any number of bits and/or channels). |
| Computer Rendered Image: | an image which has its origin as computer generated data rather than an image which is provided to the computer from a picture via a scanner |
| Color Space: | any coordinate system for numerical color data in an image based on physical colors in a picture. |
| Linearly Proportional Data: | data pertaining to an image which has the characteristic that numerical intensity values of the image have ratios equal to the corresponding ratios of physical intensity values for an associated input picture or output picture. This includes data where the ratios are known but not equal, where equal ratios can be derived (e.g. logarithmic data). |

First Embodiment

One embodiment of this invention is described with reference to FIG. 1, and includes two stages. The first stage 1A is a calibration stage which is preferably performed relatively rarely, depending on system drift, for example. Stage 1B is an image correction stage which is performed automatically on each scanned image.

Figure 1:
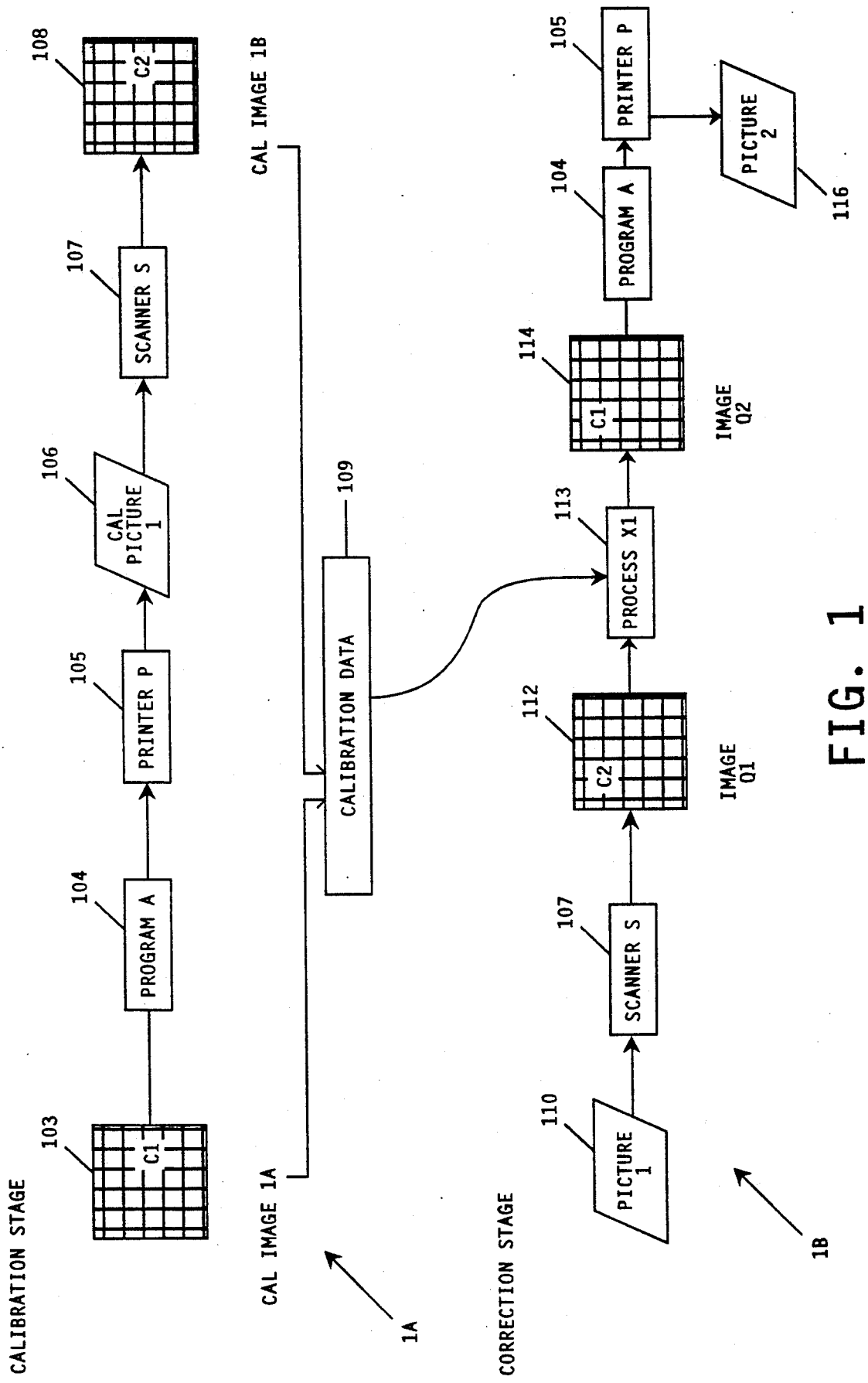
FIG. 1 is a diagram depicting a first embodiment of a computer imaging system including calibration and correction which is performed in accordance with the teachings of this invention.

Referring still to FIG. 1, in calibration stage 1A, the user begins with calibration image 103 stored as a pixel pattern in computer memory. Calibration image 103 is provided, for example, on a disk or is generated by a program, as is well known. Calibration image 103 is processed in 104, for example, by program A, which in fact may either be called by or be a portion of another one or more programs. Running program A ultimately results in the image being printed as calibration picture 106 by printer 105. If desired, program A may include color separations and half tone dot generation. The resulting calibration picture 106 is scanned by scanner 107, with the resultant scanner data being stored in computer memory as calibration image 108. Calibration image 108 is then compared with original calibration image 103. The result of this comparison is used to compute data which is stored as calibration data 109.

In correction stage 1B, picture 110 is scanned by scanner 107 in order to obtain image 112 stored in computer memory. Correction process 113 is performed utilizing calibration data from Step 109 in order to create anti-distorted image 114 from image 112. Anti-distorted image 114 is then processed by program A shown in Step 104, which is the same or substantially similar to program A shown in Step 104 of calibration stage 1A. Since program A in Step 104 will introduce the same distortions as it does in calibration stage 1A, when anti-distorted image 114 is later printed by printer 105, the resultant picture 116 appears substantially the same as picture 110. Thus, Step 113 anti-distorts image 112 to provide anti-distorted image 114 which is then distorted by program A in Step 104. The anti-distortion provided by Step 113 compensates for the distortion introduced by program A, scanner 107, and printer 105.

Correction Step 113 is based on the following principle. In calibration stage 1A, assume that a region of calibration image 103 has a color C1, as shown. Further, assume that after being processed by program A in 104 of calibration stage 1A, and printed by printer 105 to provide calibration picture 106, this region appears as the color C2 when calibration picture 106 is scanned by scanner 107 to provide calibration image 108. In correction stage 1B, assume a region in picture 110 becomes color C2 when scanned by scanner 107. Correction process 113 anti-distorts the computer image by substituting color C1 for color C2. We know from calibration stage 1A when the resulting image 114 is run through the same printing process (i.e. program A and the same printer) as calibration image 103 was in calibration stage 1A, color C1 is printed as a color that is seen by scanner 107 as color C2. Thus, to scanner 107, output picture 116 has the same colors as original input picture 110. Correction step 113 requires a monotonic function that assigns colors from image 103 to image 108. This monotonic function can use any of a variety of standard methods including least-squares fitting, smoothing, or linear interpolation.

Second Embodiment

A second embodiment of this invention also consists of two stages. The calibration stage is illustrated in FIG. 2a, and the correction stage is illustrated in FIG. 2b.

Figure 2A:
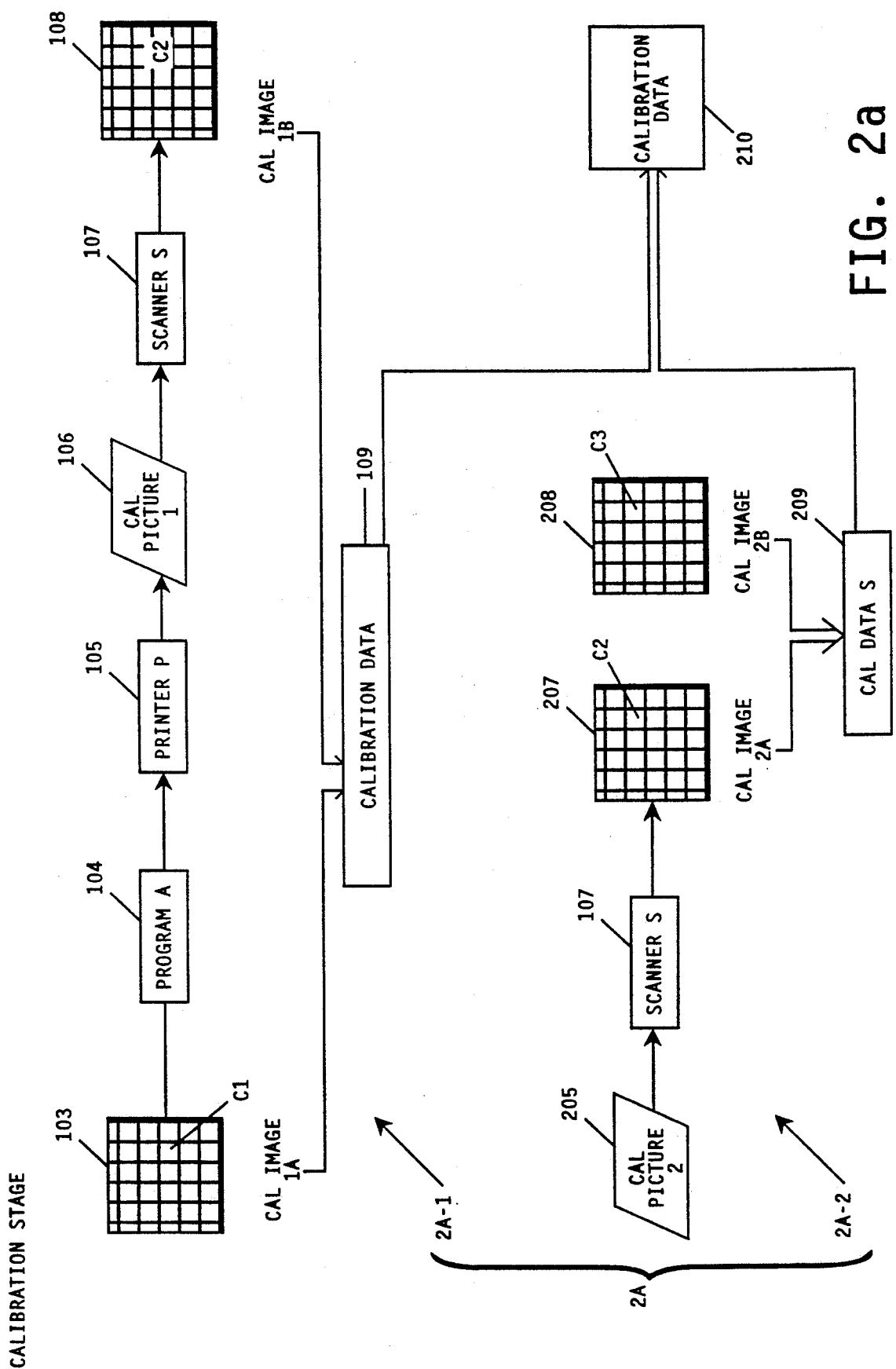
FIG. 2a depicts a second embodiment of a calibration operation performed in accordance with the teachings of this invention.

Referring to FIG. 2a, calibration stage 2A includes calibration stage 2A-1 (which has been previously described as calibration stage 1A with reference to FIG. 1), in order to obtain calibration data 109. In addition, calibration stage 2A of this embodiment includes stage 2A-2. Here, the user scans a known picture 205 using scanner 107 (i.e. the same scanner used in calibration stage 1A). The result is stored as calibration image 207. Calibration image 207 is compared with the known correct values for picture 205, which have been previously determined and entered as data which is stored as calibration image 208. The results of this comparison are stored as calibration data 209, the data necessary to calibrate scanner 107 in order to scan a picture and produce linearly proportional data. Calibration data 209 and calibration data 109 are used to generate calibration data 210, the data necessary to calibrate printer 105 in combination with "Program A" of Step 104 so that the printed colors will have intensity values that are linearly proportional to the image data. Of interest, this separates the calibration of printer 105 which is based on calibration data 210 from the calibration of scanner 107, which is based on calibration data 209.

Figure 2B:
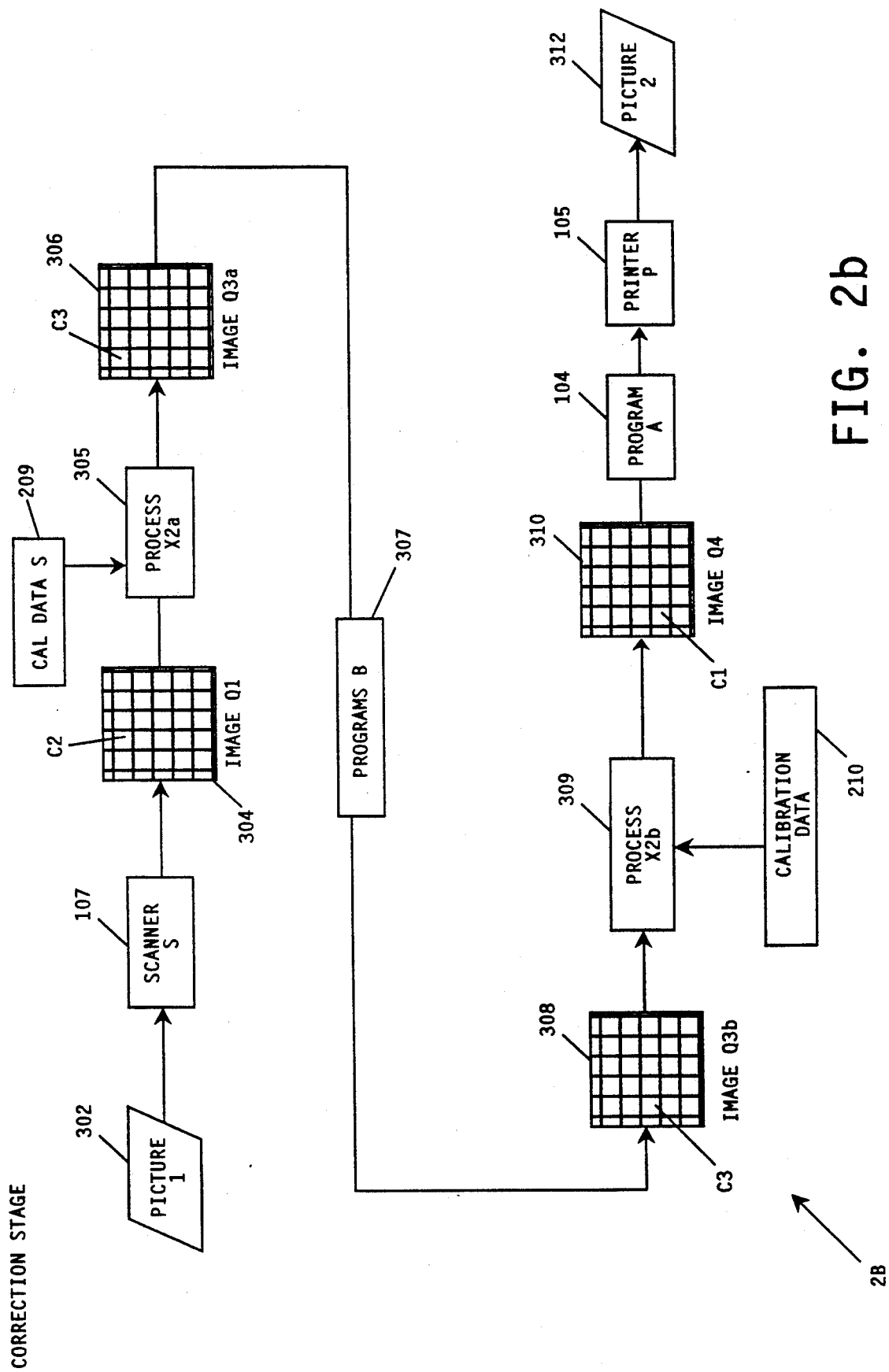

In correction stage 2B of this embodiment, shown in FIG. 2b, picture 302 is scanned by scanner 107 to create image 304. Image 304 is corrected by a process 305 based on calibration data 209 to obtain image 306, which has been corrected for distortions introduced by scanner 107. Image 306 has pixel values that are linearly proportional to the intensity values in the original picture 302 and thus are better suited for processing by "Programs B" (Step 307), such as image editing, painting, or matting programs. Image 306 is then, if desired, manipulated (Step 307) by "Programs B" to produce an image 308 which is further corrected by Step 309 based on calibration data 210, which in turn is based on calibration data 109 and 209 as previously described with reference to FIG. 2. Correction Step 309 thus produces image 310 which has been corrected to account for distortions that will be introduced by program 104 and printer 105. Image 310 is then processed by "Program A" in Step 104 and printed on printer 105 to produce picture 312. Picture 312 looks substantially like picture 302, except for manipulations performed by Step 307.

In this embodiment, the correction process of Step 305 is based on the following principle. In calibration stage 2A (FIG. 2a), assume that when calibration picture 205 is scanned by scanner 107, a region of the resulting calibration image 207 has a color C2. Furthermore, assume that the known correct value for this region is the color C3, as stored in calibration image 208. In correction stage 2B (FIG. 2b), assume a region in picture 302 is stored as color C2 when scanned by scanner 107. Correction Step 305 substitutes color C3 for C2 to create image 306. The color stored in image 306 is now the correct color and can be manipulated as such by Programs B of Step 307.

The correction process of Step 309 is based on the following principle. In calibration stage 2A (FIG. 2a) assume that a region of calibration image 103 has a color C1. Further assume that after being processed by "Program A" of (Step 104) and printed on printer 105, this region has a color C2 in image 108 when calibration picture 106 is scanned by scanner 107. In correction stage 2B (FIG. 2b), assume a region in picture 302 is stored as color C2 in image 304 when picture 302 is scanned by scanner 107. Assume further that this color C2 is changed to color C3 by the correction process of Step 305 to create image 306. Further assume for the purposes of this explanation that Program B does not manipulate the image data. Programs B are intended to alter the image, so the intent here is to provide programs B with linearly proportional data so that the manipulations do not have errors introduced from working on distorted data. The correction process of Step 309 is equivalent to reversing the correction process of Step 305 and then applying the correction process of Step 113 from FIG. 1. The region of image 308 of color C3 is known to represent a region that was scanned as color C2 (before correction by Step 305), and color C1 is known to print so that it looks like color C2 to scanner 107. So the correction process of Step 309 substitutes color C1 for C3 to create image 310. Notice that this substitution of color C1 for color C3 does not depend on the color C2 seen by the scanner 107, but only on the scanner-independent color C3. This eliminates from Step 309 any dependence on the characteristics of scanner 107. If some other scanner were used that provided color C4, rather than color C2, the calibration data associated with the other scanner would cause color C3 to be substituted for color C4 in Step 305, as desired. In this event, Step 309 will still substitute color C1 for color C3.

When the resulting image 310 is run through the same printing process as was calibration image 103 in calibration process 2A-1, color C1 is printed in picture 312 as color C2 as seen by scanner 107. Thus to scanner 107, picture 312 has the same colors as original picture 302, except for changes made by Programs B of Step 307, as desired. A similar result occurs when Program B actually manipulates the image data, with the changes being accurately reflected due to the use of linearly proportional data. This method also works when image 308 is a computer rendered image, rather than originating from picture 302 via scanner 107, assuming that computer rendered image 308 has linearly proportional data.

Figure 3:
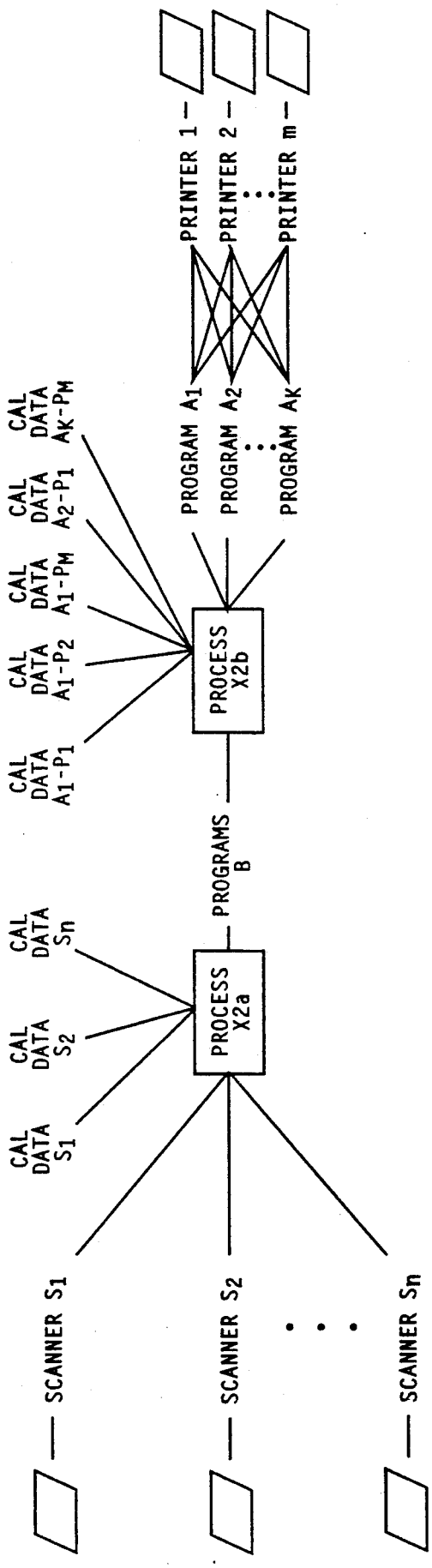
FIG. 3 depicts how the embodiments of FIGS. 2a and 2b are utilized in conjunction with a plurality of input devices, output programs, and output devices.

As shown in the embodiment of FIG. 3, the calibration stage is performed on a number of different scanners S1 through Sn and a number of different printing programs A1 through Ak and printers P1 through Pm. In this embodiment, the system is capable of taking input data from any of scanners S1 through Sn and providing output data to any of printers P1 through Pm, utilizing, if desired, any one of output programs A1 through Ak. Regardless of the combination selected, the image printed by the selected printer is calibrated to appear substantially identical with the input image received from the selected scanner, except for those manipulations performed by "programs B", if utilized. This is true even if the scanners and printers have not been calibrated in every combination.

For example, in one embodiment a slide scanner is used for input and calibrated using a printing process that makes slides, but a reproduction of a scanned slide is also capable of being printed on paper using a different printing process that was calibrated using a flatbed scanner.

In this embodiment, linear data values are generated, i.e., data values which are linearly proportional to the actual values of the picture. This allows separate calibrations to be performed for scanners, output programs A and printers, which can be then be selected as desired without further calibration, in order to cause the image stored in the computer to look like the print, and to make accurate prints of computer-generated data. The teachings of this embodiment allow for manipulation of the image by manipulation programs B such as image editing, painting, or matting programs. These programs require pixel values in the image that are linearly proportional to the intensity values in the original image; otherwise they may introduce artifacts into the image.

So far, the effects of using different programs A have not been considered separately from using different printers P. For a given scanner, the user may wish to use at times n different programs A and require m different printers P. As described thus far, both embodiments would require the user to perform n*m different calibrations in this case. A modification to this technique would instead require the user to perform calibrations only once for each printer P and once for each program A, a total of n+m-1 calibrations. For example, the user could calibrate each of the m printers P1 through Pm using program A1, and then calibrate each of the n programs A1 through An using printer P1. From these n+m-1 calibrations, the rest of the n*m calibrations could be derived for use in the correction process, using the following principle.

Assume that we have calibrated the following combinations:
1. Program A1 with printer P1
2. Program A1 with printer P2
3. Program A2 with printer P1

We will now show with reference to Table 1, how to derive from this information the calibration information for the combination,
4. Program A2 with printer P2

TABLE 1

| |
| --- |
| C1 → program A1 → (C1') → printer P1 → scanner → C2 |
| C1 → program A1 → (C1') → printer P2 → scanner → C3 |
| C4 → program A2 → (C1') → printer P1 → scanner → C2 |
| ?? → program A2 → (C1') → printer P2 → scanner → C3 |

Assume that color C1, when processed by program A1 and printed on printer P1, appears to the scanner as color C2. Then, as described above, if the color C2 is subsequently scanned, the color C1 is substituted for it so that the print produced by program A1 and printer P1 looks to the scanner like the original image. Now consider the color produced as an intermediate step between program A1 and printer P1. Let us call this color C1'. We have no way of measuring the value of this color because it is an intermediate step in the output process.

Now assume that for program A1 and Printer P2, color C1 prints as color C3. Note that the substitution of P2 for P1 does not change the value of C1', since C1' depends only on processing by program A1. Further assume that for program A2 and printer P1, a different color, which we shall call C4, prints as color C2. Because the relationship between the input and the output of the printer is continuous and well-behaved, it is reasonable to assume that the input to printer P1 (and thus the output of program A2) was again C1'. Since this intermediate color C1' will print as color C3 on printer P2, and since we already know that program A2 will convert color C4 to color C1', we know that for the combination of program A2 and printer P2, the color C4 will print as C3. Thus we have derived that the last line in Table 1 would be C4→program A2→(C1')→printer P2→scanner→C3.

We know this without having to perform the calibration on this combination of program and printer explicitly. Given any three of the following calibrations:

| Program | Printer |
| --- | --- |
| A1 | P1 |
| A1 | P2 |
| A2 | P1 |
| A2 | P2 | we can derive the fourth without having to perform the calibration explicitly.

Alternative Embodiments

If desired, the color substitutions performed by the correction processes of steps 113, 305 and 309 can be based on any suitable technique, such as lookup tables, approximations using fitted correction curves, or other means which are well known in the prior art. Accordingly, it is not necessary to include all possible colors C1 in the calibration image; a representative subset of the colors can be used, in which case the calibration information for the rest of the colors can be derived from the calibration information of the representative subset using suitable interpolation techniques as are well known. Any colors C1 which cannot be produced by outputting any color C2 are said to be outside the range or gamut of the printing device; when one of these colors is scanned in step 107, it can be replaced as part of process 113 by a similar color that is inside the gamut, using techniques as are well known (e.g., decreasing the saturation or purity of the color). Alternatively, all of the colors C1 can be adjusted in a consistent manner so that all of the adjusted colors can be produced on the printing device.

If desired, default calibration data can be provided such that the user is capable of obtaining good, though not necessarily optimal, results with their particular hardware (e.g. scanner and printer) without the need for the user to perform a calibration stage. For example, the vendor of a system constructed in accordance with the teachings of this invention can provide a plurality of sets of calibration data, each set corresponding to an associated model of scanner or printer. A user is then able to select the default calibration for his scanner and printer models. While this calibration data will provide highly accurate results, even greater accuracy can be provided should the user form his own calibration sets for the particular scanner(s) and printer(s) used.

In accordance with the teachings of this invention, a wide variety of image input, generation, manipulation, and output functions can be performed in a calibrated manner which adjusts for the idiosyncracies of the input and output devices, as well as the methods used for manipulating the image data. For example, the teachings of this invention can be used in conjunction with a color separation process, i.e., process that translates RGB color data into the CMYK color data needed by many printers Alternatively, the teachings of this invention can be used as a new color separation process, replacing the traditional color separation process. In the first embodiment of this invention this follows simply by using CMYK color space values for color C1 and RGB color space values for color C2, as shown in Table 2. In the second embodiment of this invention, this follows simply by using CMYK color space values for colors C1 and C2, while RGB color space values are used for color C3, as shown in Table 3.

Table 2 shows various alternative embodiments, which are not to be construed as limiting, which show the relationship between colors C1 and C2 of embodiment 1 described above.

TABLE 2

| $C_1$ | $C_2$ |
|---|---|
| $Grey_1$ | $Grey_2$ |
| $R_1G_1B_1$ | $R_2G_2B_2$ |
| CMYK | RGB |

Similarly, Table 3 shows the various alternative color relationships between colors C1, C2 and C3 in embodiment 2, without intending this list to be limiting.

TABLE 3

| $C_1$ | $C_2$ | $C_3$ |
|---|---|---|
| $Grey_1$ | $Grey_2$ | $Grey_3$ |
| $R_1G_1B_1$ | $R_2G_2B_2$ | $R_3G_3B_3$ |
| $C_1M_1Y_1K_1$ | $R_2G_2B_2$ | $R_3G_3B_3$ |
| $C_1M_1Y_1K_1$ | $C_2M_2Y_2K_2$ | $R_3G_3B_3$ |

Naturally, various alternative color combinations, also known as "color spaces" can be used with regard to one or more of the scanners and printer.

All publications and patent applications are herein incorporated by reference to the same extent as if each individual publication or patent application was specifically and individually indicated to be incorporated by reference. The invention now being fully described, it will be apparent to one of ordinary skill in the art that many changes and modifications can be made thereto without departing from the spirit or scope of the appended claims. For example, the teachings of this invention are equally applicable to any image input devices (scanners) and/or image output devices (printers), such as those described above.

What is claimed is:

1. A method for printing images from an imaging system comprising a computer, one or more printers, and one or more scanners, said method comprising the steps of:

performing a calibration operation comprising the steps of:

generating a set of known calibration image data;

producing a first set of derived image data from said set of known calibration image data;

printing on one of said printers a calibration picture from such first set of derived image data;

scanning said calibration picture via one of said scanners, and generating a set of scanned image data therefrom;

comparing said known image data and said scanned image data; and creating a set of calibration data as a result of said comparison; and performing a correction operation comprising the steps of:

scanning an input picture via one of said scanners and generating a set of input image data;

using said calibration data to anti-distort said input image data and create a set of anti-distort image data;

producing a second set of derived image data from said anti-distorted image data using said program; and printing on one of said printers an output picture utilizing said second set of derived image data, said output picture corresponding to said input picture.

2. The method as in claim 1, wherein said step of producing a first set of derived image data comprises the step of providing altered image data using a program having characteristics which need not be known to said method.

3. The method as in claim 1, wherein the appearance of said output picture is substantially similar to the appearance to said input picture.

4. The method as in claim 1, wherein said anti-distortion compensates for the distortions caused during said steps of scanning, altering, and printing.

5. The method as in claim 1, wherein said method serves as means for converting from one color space to another.

6. The method as in claim 1, wherein said method serves as a color separation process.

7. The method as in claim 6, wherein said color separation process converts from RGB color space to CMYK color space.

8. A method for printing images comprising the steps of:

performing a calibration operation comprising the steps of:

generating a first set of known image data;

producing a first set of derived image data from said first set of known image data;

printing a first calibration picture from such first set of derived image data;

scanning said first calibration picture and generating a first set of scanned imaged data therefrom;

performing a first comparison of said first set of known image data and said first set of scanned image data, and creating a first set of calibration data as a result of said comparison;

scanning a second known calibration picture and generating a second set of scanned image data therefrom;

performing a second comparison of said second set of scanned image data with a second set of known image data, said second set of known image data being previously stored as known accurate data corresponding to said second known calibration picture;

generating a second set of calibration data from said second comparison, said second set of calibration data being associated with distortions introduced by said scanning process; and utilizing said first and second sets of calibration data to generate a third set of calibration data, said third set of calibration data being associated with distortions introduced by said printing process; and performing a correction operation comprising the steps of:

scanning an input picture and generating a set of input image data;

using said second set of calibration data to anti-distort said set of input image data and creating a set of linearly proportional image data which has been corrected for distortions introduced by said step of scanning said input picture;

producing a set of edited image data from said set of linearly proportional image data using a second program;

using the said third set of calibration data to anti-distort said set of edited image data, thereby creating a set of anti-distorted image data which has been compensated for distortions which will be introduced by to-be-performed steps of altering and printing;

producing a second set of derived image data from said set of anti-distorted image data using said first program; and printing an output picture utilizing said second set of derived image data.

9. The method as in claim 8, wherein said step of producing a first set of derived image data comprises the step of providing altered image data using a program having characteristics which need not be known to said method.

10. A method as in claim 8, wherein said second program performs operations which edit said image data but which does not introduce unwanted distortions.

11. The method as in claim 8, wherein the appearance of said output picture is substantially similar to the appearance to said input picture.

12. The method as in claim 8, wherein said anti-distortion compensates for the distortions caused during said steps of scanning, altering, and printing.

13. The method as in claim 8, wherein said method serves as means for converting from one color space to another.

14. The method as in claim 8, wherein said method serves as a color separation process.

15. The method as in claim 14, wherein said color separation process converts from RGB color space to CMYK color space.

16. A color distortion reduction system, for reducing color distortion caused by differing valuation of colors between a scanner, a printer, and an image processor, wherein the scanner outputs image data corresponding to a printed image sensed by the scanner, wherein the printer generates a printed image in response to image data output by the image processor, and wherein the image processor derives the image data output to the printer from image data input to the image processing program, the color distortion reduction system comprising:

reference generating means for generating a reference digital image which comprises a plurality of reference areas each colored with one of a plurality of colors, where said reference digital image is output in the form of image data;

input means, coupled to said reference generating means and the image processor, for inputting said reference digital image into the image processor;

output means, coupled to the image processor and the printer, for outputting a first processed digital image to the printer, where said first transformed digital image is an output of the image processor corresponding to said reference digital image, thereby resulting in a processed printed image;

calibration input means, coupled to the scanner, for accepting a second processed digital image output by the scanner in response to scanning said processed printed image;

means, coupled to said reference generating means and said calibration input means, for generating a color conversion table, wherein said color conversion table comprises a color pair associated with each of said plurality of reference areas, and wherein a color pair comprises a first color value representing said color of said associated reference area and a second color value representing a color of said associated reference area in said second processed digital image; and means, coupled to the scanner, for replacing pixel color values in an input image with converted color values, where a pixel color value and its converted color value are found as said second color value and said first color value, respectively, of a color pair in said color calibration table, thereby correcting for color distortion of said input image due to the combination of the scanner, the image processor, and the printer.

17. The apparatus of claim 16, wherein characteristics of the image processor other than an image input format and an image output format are unknown to the color distortion reduction system.

18. A method of correcting for color distortion caused by differing valuation of colors in printed images and digital representations thereof, for use in an image processing system which uses a scanner to convert a printed image into a digital image representing the printed image, a printer to generate a printed image from a digital image, and an image processing program to manipulate an input digital image into an output digital image, comprising the steps of:

generating a reference digital image representing a reference printed image comprising a plurality of reference areas each colored with one of a plurality of colors;

inputting said reference digital image as an input digital image to the image processor;

printing an intermediate printed image, using the image processor and the printer, corresponding to said input digital image;

scanning said intermediate printed image with the scanner to produce an intermediate digital image;

generating a color conversion table from said intermediate digital image and said reference image, said color conversion table comprising a plurality of color value pairs each associated with one reference area of said plurality of reference areas, wherein a color value pair comprises a first color value representing a color value of said associated reference area in said reference digital image and a second color value representing a color value of said associated reference area in said intermediate digital image;

scanning a subject printed image using the scanner, to create an uncompensated digital image, said uncompensated digital image comprising a plurality of pixels each characterized by a pixel color value; and generating a compensated digital image, wherein a pixel color value for each pixel in said compensated digital image is determined by locating a color value pair in said color conversion table which has a second color value closest to a pixel color value for a corresponding pixel in said uncompensated image and setting said pixel color value of said compensated digital image pixel equal to the first color value of the located color value pair.

* * * * *